United States Patent
Zhang et al.

(10) Patent No.: US 9,948,680 B2
(45) Date of Patent: Apr. 17, 2018

(54) SECURITY CONFIGURATION FILE CONVERSION WITH SECURITY POLICY OPTIMIZATION

(71) Applicant: Fortinet, Inc., Sunnyvale, CA (US)

(72) Inventors: Jianwen Zhang, Saratoga, CA (US); Haixiang Gong, Beijing (CN)

(73) Assignee: Fortinet, Inc., Sunnyvale, CA (US)

( * ) Notice: Subject to any disclaimer, the term of this patent is extended or adjusted under 35 U.S.C. 154(b) by 153 days.

(21) Appl. No.: 14/982,274

(22) Filed: Dec. 29, 2015

(65) Prior Publication Data
US 2017/0187750 A1 Jun. 29, 2017

(51) Int. Cl.
*H04L 29/06* (2006.01)
*G06F 17/30* (2006.01)

(52) U.S. Cl.
CPC ........ *H04L 63/20* (2013.01); *G06F 17/30076* (2013.01); *G06F 17/30961* (2013.01)

(58) Field of Classification Search
CPC ............... H04L 63/20; G06F 17/30076; G06F 17/30961
See application file for complete search history.

(56) References Cited

U.S. PATENT DOCUMENTS

| | | | |
|---|---|---|---|
| 8,539,548 B1* | 9/2013 | Overby, Jr. | G06F 21/6218 726/1 |
| 9,083,749 B1* | 7/2015 | Roth | H04L 63/20 |
| 9,369,431 B1* | 6/2016 | Kirby | H04L 63/20 |
| 2013/0086625 A1* | 4/2013 | Driscoll | G06F 21/52 726/1 |

* cited by examiner

*Primary Examiner* — Tri Tran
(74) *Attorney, Agent, or Firm* — Hamilton, DeSanctis & Cha LLP

(57) ABSTRACT

Systems and methods for converting a configuration file from a first language into a second language with policy optimization and auditing are provided. According to one embodiment, a network appliance configuration converter parses network security policies of an input configuration file of a first network appliance to intermediate representations. The network security policies of the input configuration file are in a first language and the intermediate representations are general data structures for describing network security policies. The network appliance configuration converter optimizes network security policies in the intermediate representations and converts the intermediate representations to security policies of an output configuration file in a second language.

16 Claims, 5 Drawing Sheets

SECURITY CONFIGURATION FILE CONVERSION WITH SECURITY POLICY OPTIMIZATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to the field of network security techniques. In particular, various embodiments relate to network security configuration file conversion with security policy auditing and optimization.

Description of the Related Art

Network security appliances, such as firewalls, are used for protecting networks from attacks, including, but not limited to, as malware, virus and Distributed Denial of Service (DDoS). An administrator may deploy a network security appliance at a border of a private network and configure a set of security policies in accordance with the needs of the private network. The network security appliance then checks network traffic going through the private network based on the security policies. An action, such as allow, deny or deep scanning, may be taken on the network traffic when the traffic triggers a security policy. The security policies of a large network can be very complicated because the security policies may be defined based on many parameters, including, but not limited to, the sources/destinations, protocols, applications of the network traffic, the roles of the users, schedules, domains and services. The security policies of a network security appliance may be stored within or backed up to a configuration file. As hundreds of security policies may be included in the configuration file, the security polices of the configuration file may be written/arranged in a script or language that is defined by the vendor of the network security appliance. Different vendors may have different scripts/languages for their respective configuration files. When an old network security appliance from one vendor is replaced by a new network security appliance of another vendor, the configuration file of the old network security appliance cannot be used by the new network security appliance because the syntax of the configuration file of the old network security appliance cannot be parsed by the new network security appliance. Usually, a converter from a network security appliance vendor or a third party may be used for converting a configuration file from a first language to a second language. However, the converter usually cannot fully convert a configuration file from one language to another as the languages of configuration files from different vendors may have different functions as well as different syntax to express functions of their respective network security appliances. For example, multiple functions of a network security appliance from a first vendor may be defined by one security policy in a first language of the first vendor. The same multiple functions may not be defined by one security policy in a second language of a second vendor. In this scenario, the converter may parse the security policy in the first language and convert it into multiple security policies in the second language to cover the multiple functions of the security policy. Here, the conversion integrity rate of input policy to output policy is 1:n instead of 1:1, and some policy fragments may be generated as a result. For a well-managed network security appliance, each security policy in the configuration file may have a note or comment to describe the function of the policy. The security policy together with such notes or comments may have been examined and approved by the network security administrators. The 1:n conversion and policy fragments may affect the maintenance of security policies and may result in the inadvertent creation of security vulnerabilities within the computer networks at issue.

The following are examples of security vulnerabilities that may be introduced as a result of a 1:n conversion:

1. Repeated policies, in which all 5-tuples of the security policies are the same. Here, the source IP addresses, the source ports, the destination Internet Protocol (IP) addresses, the destination ports and the actions of two policies are the same.
2. Conflicting policies, in which only the actions associated with 5-tuples of two or more security policies are different. Here, the source IP addresses, the source ports, the destination IP addresses and the destination ports of two or more policies are the same, but the actions defined by the two or more policies are different.
3. Encompassing policies, in which the IP addresses and/or the ports of a policy encompass IP addresses and/or ports of another policy while the actions are the same;
4. Mergeable policies, in which a tuple, e.g., the source IP addresses, the source ports, the destination IP addresses and/or the destination ports of two or more policies is different while the actions of the two or more policies are the same.

Therefore, there is a need for a converter with security policy auditing and optimization to improve the integrity of security policy conversion.

SUMMARY

Systems and methods are described for converting a configuration file from a first language into a second language with policy optimization and auditing. According to one embodiment, a network appliance configuration converter parses network security policies of an input configuration file of a first network appliance to intermediate representations. The network security policies of the input configuration file are in a first language and the intermediate representations are general data structures for describing network security policies. The network appliance configuration converter optimizes network security policies in the intermediate representations and converts the intermediate representations to security policies of an output configuration file in a second language.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
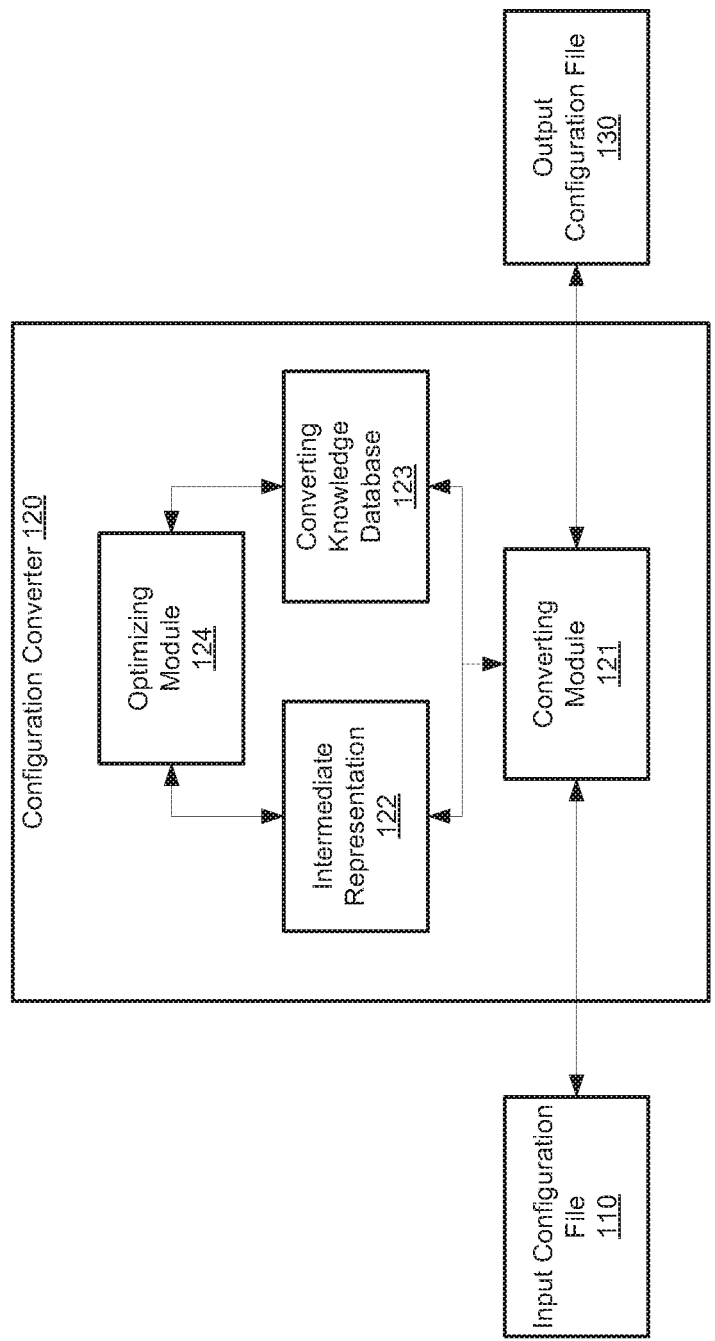
FIG. 1 illustrates exemplary functional units of a configuration converter in accordance with an embodiment of the present invention.

Systems and methods are described for converting a configuration file from a first language into a second language with policy optimization and auditing. In one embodiment, a network appliance configuration converter parses network security policies of an input configuration file of a first network appliance into intermediate representation. The network security policies of the input configuration file are in a first language and the intermediate representation is in the form of general data structures for describing network security policies. The network appliance configuration converter optimizes network security policies in the intermediate representation and converts the intermediate representation to security policies of an output configuration file in a second language.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates exemplary functional units of a configuration converter 120 in accordance with an embodiment of the present invention. In the present example, configuration converter 120 may receive an input configuration file 110 in which security policies are expressed in a first language and convert input configuration file 110 to an output configuration file 130 in which the security policies are expressed in a second language. Input configuration file 110 can be parsed and executed by a first network security appliance from a first vendor and output configuration file 130 can be parsed and executed by a second network security appliance from a second vendor. Both the first language and the second language can be used for defining network security policies that control network traffic going through a network. A language of a configuration file may be a scripting language. Commands of the scripting language can be interpreted at runtime and executed by a network security appliance through a command line interface (CLI). An example of a configuration file written in a scripting language is shown below:

Example 1

```
!
time-range outdate1
    absolute start 19:00 04 September 2008 end 18:00 31 December 2012
    periodic Thursday 19:00 to Friday 2:00
test
    service-object tcp eq ssh
    service-object tcp eq telnet
access-list 3001 extended permit tcp 172.xxx.xxx.xxx 255.255.255.0 host 202.xxx.xxx.xxx eq 5607 time-range outdate1
```

A language of a configuration file may also be a compiled language that can be compiled before it is executed by a network security appliance. An example of a configuration file written in a language that is compiled before being executed is shown below:

Example 2

```
version 10.4R9.2;
groups { # Global groups0
    node0 {
        system {
            host-name XXX;
            services {
                outbound-ssh {
                    client nsm {
                        services netconf;# Global groups1
                        172.xxx.xxx.xxx port 7804;
                    }
                }
            }
            syslog {
                file default-log-messages {
                    any any;
                    structured-data;# Global groups2
                }
            }
        }
        interfaces {
            fxp0 {
                description "MANAGEMENT INTERFACE (Non-Transit)";
            }
        }
    }
}
apply-groups "${node}";
system {
    domain-name xxxx;
    root-authentication {
        encrypted-password "XXXXXXX";
    }
    name-server {
        xxx.xx.xx.xx;
    }
}
policy-options {
    policy-statement MGN-BGP-ROUTES-OUT {
        term allowed-lan {
            from {
                route-filter 172.xxx.xxx.xx/22 exact accept;
            }
            then reject;
        }
    }
}
```

In the present example, configuration converter 120 includes a converting module 121, an intermediate representation 122, a converting knowledge database 123 and an optimizing module 124. Converting module 121 is used for reading the security policies of input configuration file 110 and parsing the security policies into intermediate representation 122 by a compiler or interpreter of the language in which they are expressed. Each security policy may be defined by a 5-tuple, including, for example, a source IP address (or range or set of addresses), a source port (or range or set of addresses), a destination IP address (or range or set of addresses), a destination port (or range or set of ports) and one or more actions. The one or more actions specify action(s) to be taken for traffic matching the security policy. The actions may include, but are not limited to, allowing the traffic to pass, denying the traffic, logging the traffic and performing a deep scan on the traffic. It will be apparent to one skilled in the art that other information or parameters of the network traffic as well as user information may be used for defining network security policies. For example, a security policy may include services, protocols, applications of network traffic, schedules, and user identifications in controlling the network traffic. If input configuration file 110 is in a scripting language, an interpreter of converting module 121 may be used for interpreting input configuration file 110 and converting the security policies of input configuration file 110 into intermediate representations 122. If input configuration file 110 is in a compiled language, a compiler of converting module 121 may be used for compiling security policies of input configuration file 110 into intermediate representation 122.

Intermediate representation 122 may include syntax trees that are generated by converting module 121 after syntax abstracting of the source code of input configuration file 110. Regardless of what language is used by input configuration file 110, a corresponding language compiler or interpreter may convert the source code of input configuration file 110 into intermediate representation 122, which may include general data structures for representing network security policies.

Optimizing module 124 is used for optimizing network security policies that are represented by intermediate representation 122. As network security policies of input configuration file 110 are abstracted by intermediate representation 122 (e.g., unified data structures), it does not matter in what language the configuration file is written. Optimizing module 124 may be a general optimizer that takes as an input network security policies expressed in intermediate representation 122 and therefore can be used for configuration files written in any language provided by different vendors.

The optimization of security policies performed by optimizing module 124 may include configuration optimization and security auditing. Optimizing module 124 may scan security policies in intermediate representation 122 for the existence of policy fragments. A policy fragment may include, but is not limited to:

Repeated security policies wherein all 5-tuple of the security policies are the same;
Conflicting security policies wherein only action of 5-tuple of the security policies is different;
Encompassing security policies wherein IP addresses and/or ports of a policy encompass IP addresses and/or ports of another policy while the actions are the same; and
Mergeable security policies wherein only one tuple of source IP addresses, source ports, destination IP addresses and destination ports of two policies is different while actions of the two policies are the same.

Optimizing module 124 may also perform security auditing on the security policies in intermediate representation 122. Security auditing may include, but is not limited to:

Checking security policies in which an IP address is specified as ANY;
Checking security policies in which a port is specified as ANY;
Checking security policies for which a range of IP addresses is over a pre-determined threshold;
Checking security policies for which a range of ports is over pre-determined threshold;
Checking security policies that allow access to one or more pre-determined ports of an internal network; or
Checking security policies that allow access to one or more services of internal network from an external network or a demilitarized zone (DMZ).

After configuration optimization and security auditing, optimizing module 124 may display any policy fragments and potential leakage found in the security policies of intermediate representation 122 to an administrator of configuration converter 120. A suggestion for resolving a policy fragment or security leakage may also be shown to the user.

Table 1 below shows an example of conflicting policies.

TABLE 1

Conflicting Policies: Policy555:Policy3167

| Policy | Source IP | Source Port | Destination IP | Destination Port | Action |
|---|---|---|---|---|---|
| Policy555 | Any | Any | Any | Any | Allow |
| Policy3167 | Any | Any | Any | Any | Deny |

When conflicting policies, such as those shown in Table 1 are identified, optimizing module 124 may keep the first policy and filter out the other conflicting policies. Alternatively, optimizing module 124 may show a list of conflicting policies and provide a recommendation as to which one should be retained to the user of configuration converter 120. The user may select one of the conflicting policies from the list and optimizing module 124 may keep the selected one and remove the others.

Table 2 below shows an example of encompassing policies.

TABLE 2

Encompassing Policies: Policy555:Policy3167

| Policy | Source IP | Source Port | Destination IP | Destination Port | Action |
|---|---|---|---|---|---|
| Policy555 | 10.6.11.0/24 | Any | 10.6.xx.xx 10.7.xx.xx | Any | Allow |
| Policy3167 | 10.6.11.128/28 | Any | 10.6.xx.xx | Any | Allow |

When encompassing policies as shown in Table 2 are found, optimizing module 124 may ask the user if the emcompassing policy 3167 should be deleted.

Table 3 below shows an example of mergeable policies.

TABLE 3

| Policy | Source IP | Source Port | Destination IP | Destination Port | Action |
|---|---|---|---|---|---|
| Mergeable Policies: Policy555:Policy3167 | | | | | |
| Policy555 | 10.6.11.64/26 | Any | 10.6.208.173/32 | Any | Allow |
| Policy3167 | 10.6.11.192/26 | Any | 10.6.208.173/32 | Any | Allow |
| Mergeable Policies: Policy555:Policy3167 | | | | | |
| Policy555 | 10.6.11.64/26 10.6.11.192/26 | Any | 10.6.208.173/32 | Any | Allow |

When mergeable policies, such as those shown in Table 3, are identified, optimizing module 124 may ask the user to perform one of the operations below:
1. Merging Policy 3167 to policy 555, and deleting Policy 3167 (default);
2. Merging Policy 555 to policy 3167, and deleting Policy 555;
3. Keeping the original policies.

Table 4 below shows an example of repeated policies.

TABLE 4

| | | | | | |
|---|---|---|---|---|---|
| Repeated Policies: Policy555:Policy3167 | | | | | |
| Policy | Source IP | Source Port | Destination IP | Destination Port | Action |
| Policy555 | 10.6.11.64/26 | Any | 10.6.208.173/32 | Any | Allow |
| Policy3167 | 10.6.11.64/26 | Any | 10.6.208.173/32 | Any | Allow |

When repeated policies, such as those shown in Table 4, are identified, optimizing module 124 may keep the first policy and filter out the subsequent policies identified as repeated policies corresponding to the first policy. Alternatively, optimizing module 124 may show a list of repeated policies and recommend one for retention to the user of configuration converter 120. The user may select one of the repeated policies from the list and optimizing module 124 may keep the selected one and remove the others.

After receiving the selected policies for resolving policy fragments, optimizing module 124 may store an optimizing rule within converting knowledge database 123. Therefore, when optimizing module 124 meets similar policy fragments, the optimizing rule may be applied automatically and repeated security policies, conflicting security policies, encompassing security policies and mergeable security policies may be processed to avoid policy fragments.

Converting knowledge database 123 is a collection of optimizing rules for converting security policies in first language to a second language without policy fragments. An example of a security policy in a first language is shown in Example 3.

Example 3

```
time-range outdate1
   absolute start 19:00 04 September 2008 end 18:00 31
   December 2012
   periodic Thursday 19:00 to Friday 2:00
!
```

-continued

```
access-list 3001 extended permit tcp 172.11.1.0
255.255.255.0 host 202.200.100.1 eq 5607 time-range
outdate1
```

In Example 3, a time range object "outdate1" defined in the first language includes an absolute time schedule and a periodic schedule and one policy "access-list 3001" is defined under this time range object.

In a second language, a time range object may not support combining an absolute time schedule and a periodic schedule directly. Therefore, the converter may split the time range object in the first language into 3 time range objects and split the policy in the first language into 3 policies in the second language as shown in Example 4.

Example 4

```
config firewall policy
   edit 10000
      set srcintf "mgmt1"
      set dstintf "any"
      set srcaddr "n-172.11.1.0__24"
      set dstaddr "h-202.200.100.1"
      set service "TCP-5607"
      set schedule "outdate1__2008__9__04"
      set logtraffic disable
      set status enable
      set action accept
      set comments "access-list 3001 extended permit tcp
172.11.1.0 255.255.255.0 host 202.200.100.1 eq 5607
time-range outdate1"
   next
   edit 10001
      set srcintf "mgmt1"
      set dstintf "any"
      set srcaddr "n-172.11.1.0__24"
      set dstaddr "h-202.200.100.1"
      set service "TCP-5607"
      set schedule "outdate1__Thursday__19:00"
      set logtraffic disable
      set status enable
      set action accept
      set comments "access-list 3001 extended permit tcp
172.11.1.0 255.255.255.0 host 202.200.100.1 eq 5607
time-range outdate1"
   next
   edit 10002
      set srcintf "mgmt1"
      set dstintf "any"
      set srcaddr "n-172.11.1.0__24"
      set dstaddr "h-202.200.100.1"
      set service "TCP-5607"
      set schedule "outdate1__Friday__2:00"
      set logtraffic disable
      set status enable
      set action accept
```

```
    set comments "access-list 3001 extended permit tcp
    172.11.1.0 255.255.255.0 host 202.200.100.1 eq 5607
    time-range outdate1"
      next
    end
```

In Example 4, three time range objects "outdate1_2008_9_04", "outdate1_Thursday_19:00" and "outdate1_Friday_2:00" in the second language are defined to correspond with the time range object "outdate1" in the first language. Three policies "1000", "1001" and "1002" are converted in the second language to match the policy "access-list 3001" in the first language. Here, a "1:3" fragment results from the conversion.

The second language may support a schedule group object that allows combining multiple time range objects together within one object. The user of the converter may create a schedule group object "outdate1" in the second language to combine the 3 time range objects resulting from the conversion. The schedule group object in the second language corresponds to the time range object in the first language. A policy "10000" under the schedule group object in the second language may also be created by the user of the converter to match the policy "access-list 3001" in the first language. There is no "1:n" fragment after this optimization. The optimized schedule group object and the new policy in the second language are shown in Example 5.

Example 5

```
    config firewall schedule onetime
      edit "outdate1_2008_9_04"
        set end 18:00 2012/12/31
        set start 19:00 2008/9/04
      next
    end
    config firewall schedule recurring
      edit "outdate1_Friday_2:00"
        set day friday
        set end 2:00
        set start 0:00
      next
      edit "outdate1_Thursday_19:00"
        set day thursday
        set end 0:00
        set start 19:00
      next
    end
    config firewall schedule group
      edit "outdate1"
        set member "outdate1_2008_9_04"
    "outdate1_Thursday_19:00" "outdate1_Friday_2:00"
      next
    end
    config firewall policy
      edit 10000
        set srcintf "mgmt1"
        set dstintf "any"
        set srcaddr "n-172.11.1.0_24"
        set dstaddr "h-202.200.100.1"
        set service "TCP-5607"
        set schedule "outdate1"
        set logtraffic disable
        set status enable
        set action accept
        set comments "access-list 3001 extended permit tcp
    172.11.1.0 255.255.255.0 host 202.200.100.1 eq 5607
    time-range outdate1"
      next
    end
```

An optimization rule that converts a policy in the first language into the second language as shown in Example 5 may be stored within converting knowledge database 123. When converting module 121 converts similar policies in the first language to the second language, converting module 121 may perform the conversion based on the optimization rule in converting knowledge database 123 to avoid policy fragments.

Further, a private/enterprise network may have its specific settings or combinations of network security policies in the first language. These specific settings or combinations of network security policies are established according to the enterprise network's specific needs. For example, the enterprise network may have a combination of security policies of network usage, data leaking, antivirus scanning or network activity logging for a department of the enterprise. When the combination of security policies are converted from the first language to the second language, a set of optimization rules may be created so that the combination of security policies in the first language can be converted to a corresponding set of security policies that are integrated without policy fragments in the second language. When the same combination of security policies in the first language are to be converted, the set of optimization rules for the enterprise network may be utilized by the converter in order that a corresponding integrated set of security policies in the second language may be implemented. Optimization rules for an enterprise network may be accumulated over time thereby allowing the converter to perform better security policy conversion for the enterprise network over time.

Figure 2:
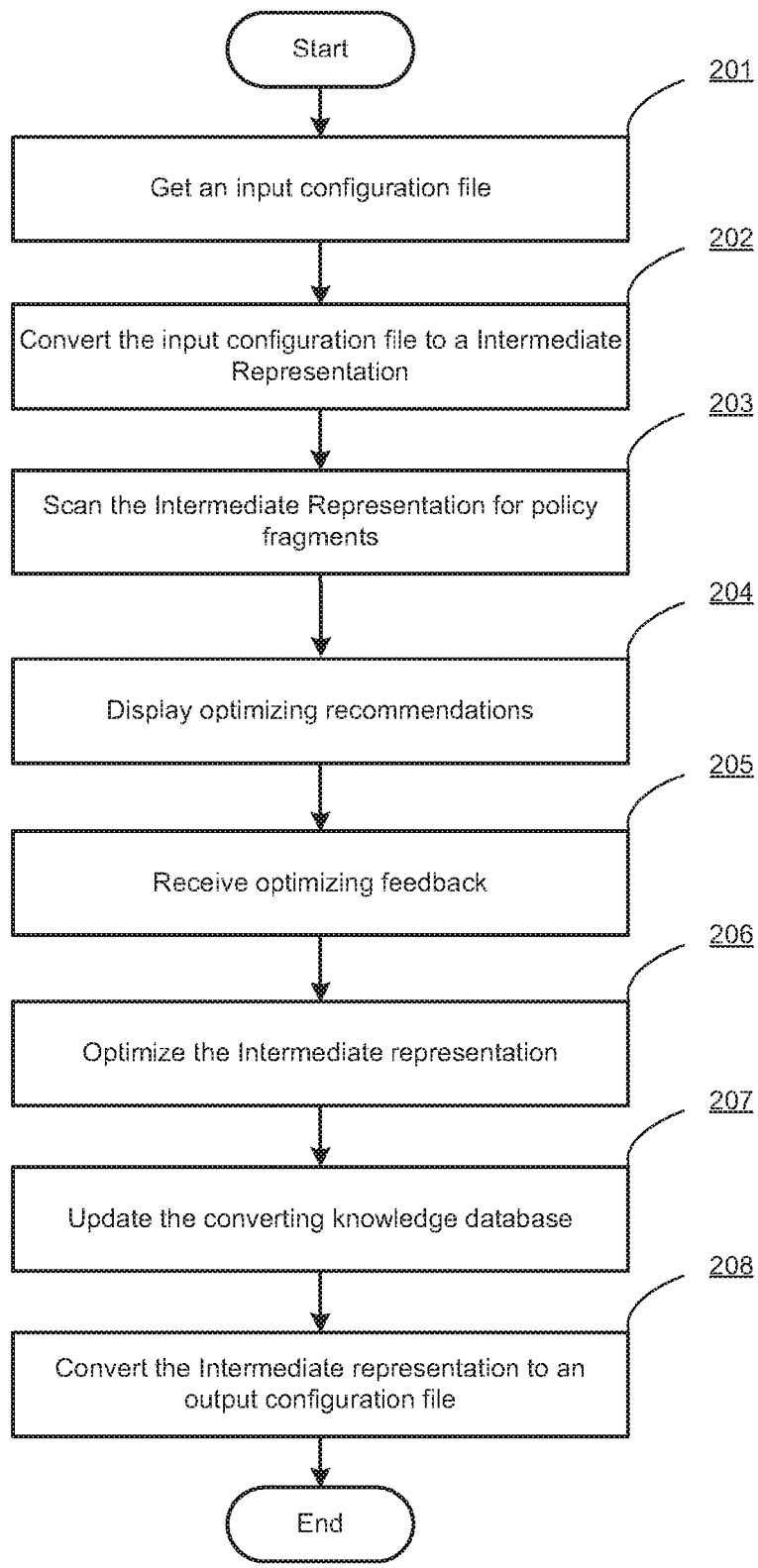
FIG. 2 is a flow diagram illustrating a method for converting a configuration file from one language to another with network security policy optimization and auditing in accordance with an embodiment of the present invention.

FIG. 2 is a flow diagram illustrating a method for converting a configuration file from one language to another with network security policy optimization in accordance with an embodiment of the present invention. In the context of the present example, optimization of the translation of network security policies may be implemented on an intermediate representation by a converter shown in FIG. 1 before the intermediate representation is translated into a second language.

At block 201, a network policy configuration file is input to a network appliance configuration converter. The network policy configuration file may have been created by a network security appliance of a first manufacturer and may include security policies expressed in a first language.

At block 202, the converter parses the network policies in the first language into intermediate representations. A compiler or interpreter of the first language may translate the network security policies from the first language into intermediate representations that are generic data structures that are not tied to a particular machine to represent network security policies. The intermediate representation may include a syntax tree representation of a network security policy. No matter what language is used by input configuration file, a corresponding language compiler or interpreter may convert the source code of input configuration file into intermediate representations.

At block 203, the converter scans the intermediate representation for any policy fragments. In the present example, the intermediate representation is the object for scanning policy fragments. Since the intermediate representation is a general data structure for representing security policies expressed in any language, there is no need to implement a scanner or optimizer of policy fragments for each individual language. For example, the converter may scan the 5-tuple of each security policy represented by the intermediate representation, including the source IP address, the source port, the destination IP address, the destination port and the action. The converter may compare the 5-tuple of each security policy with that of other security policies and find repeated policies, conflicting policies, mergeable policies and encompassing policies. The converter may also perform security auditing to security policies in intermediate representation. Security auditing may include, but is not limited to:

Checking security policies for which an IP address is specified as ANY;

Checking security policies for which a port is specified as ANY;

Checking security policies that include a range of IP addresses exceeding a pre-determined threshold;

Checking security policies that including a range of ports exceeding a pre-determined threshold;

Checking security policies that allow access to one or more of a set of pre-determined ports of the internal network; or Checking security policies that allow access to one or more services of the internal network from an external network or a demilitarized zone (DMZ).

At block 204, when a policy fragment is found in the intermediate representation by the converter, an optimization recommendation may be displayed to the user of the converter. For example, if repeated policies are found, the 5-tuple and the number of the repeated policies may be displayed and one of the repeated policies may be recommended to be kept and the others may be deleted from the intermediate representation. For conflicting policies, mergeable policies and encompassing policies, the converter may display corresponding policies and recommendations.

At block 205, the converter may receive feedback from the user regarding a policy fragment. For example, one of the repeated policies, conflicting policies, encompassing policies may be selected to be retained in the intermediate representation and mergeable policies may be allowed to be merged. In an example, the user may create a particular conversion rule or algorithm for a security policy of the first language to generate a corresponding security policy of the second language without producing policy fragments.

At block 206, the converter may optimize the intermediate representation of the network security configuration file. In one example, the converter may optimize the intermediate representation by keeping the security policies that are selected by the user at block 205 and deleting the other security policies of the policy fragments. The converter may also convert a security policy based on one or more conversion rules created by the user. In another example, the intermediate representation may be optimized by resolving policy fragments automatically. The converter may select one security policy of a set of repeated policies and delete others from the intermediate representation and merge the mergeable policies into one security policy. For encompassing policies and conflicting policies, the most secure policy of these security policies may be retained within the intermediate representation. For example, if a security policy blocks network traffic while another conflicting security policy allows the same network traffic. The converter may keep the security policy that blocks the network traffic and delete the conflicting policy. The converter may perform similar optimization for encompassing policies.

At block 207, the converter may store the optimization of policy fragments and conversion rules created by the user to the converting knowledge database in order that the same or similar policy fragments may be resolved automatically in subsequent conversion processing.

At block 208, a decompiler of a second language may be utilized to translate the intermediate representations of security policies into the second language. The translated security policies may be stored at within an output configuration file in the second language that is used by a network security appliance from a second manufacturer.

In the example of FIG. 2, the intermediate representations of security policies make it easier for the converter to convert between any two languages without requiring a dedicated converter for a particular language. The intermediate representation is also a good place for performing optimization on policy fragments for all languages because the security policies (in any language) are abstracted within uniform intermediate representations. As a result, there is no need to develop a dedicated optimization tool for multiple languages in which security policies might be initially expressed.

Figure 3:
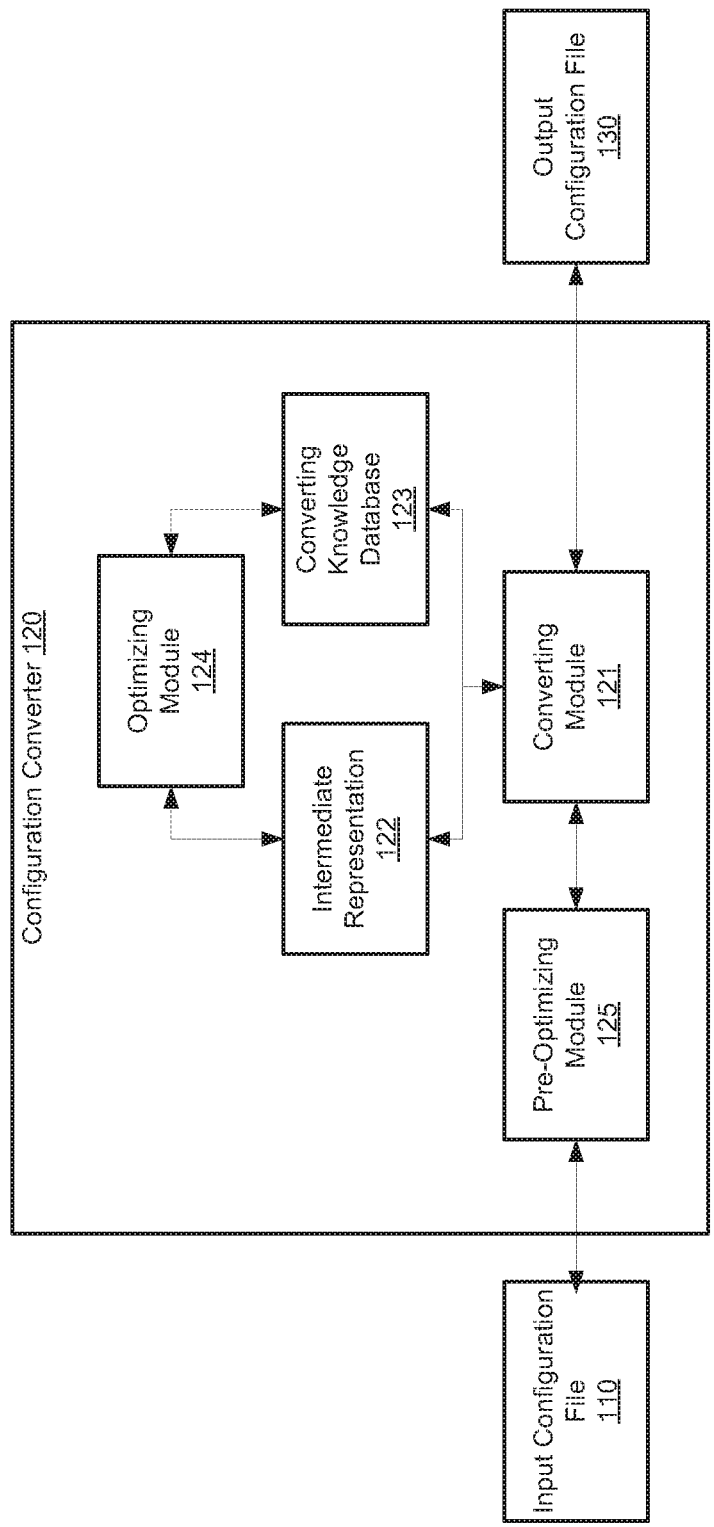
FIG. 3 illustrates exemplary functional units of a configuration converter in accordance with another embodiment of the present invention.

FIG. 3 illustrates exemplary functional units of a configuration converter in accordance with another embodiment of the present invention. In the present example, a pre-optimizing module 125 is added to configuration converter 120 as shown in FIG. 1. Pre-optimizing module 125 is used for optimizing configuration file in the first language before it is parsed by converting module 121 for translating the configuration file into the intermediate representations.

Most of the time, a security policy may define one or more actions that are to be used for controlling network traffic with designated properties. The properties of the network traffic may be divided into multiple groups and each group may further include multiple options. When the user of the network edits a security policy, some properties of the network traffic may be selected or defined. Data packets that comply with the defined properties may be checked based on the defined actions. The actions may be divided into multiple groups, such as a firewall action group, a security action group, a traffic shaping group and a logging group. Each action group may further include multiple options. The firewall action group may include accept, deny, IP Security (IPSec) and the like that are used for controlling the network traffic that matches the designated properties. The security action group may include security checking functions, including, but not limited to, antivirus scanning, web filtering, application control, intrusion prevention system (IPS), Email filtering, data loss prevention (DLP), voice-over-IP (VoIP), secure sockets layer (SSL) inspection. The traffic shaping group may include pre-defined options, including, but not limited to, traffic shaping, shared shaper, reverse shaper, per-IP shaper. The logging group may include pre-defined logging options, including, but not limited to, logging allowed traffic, logging security events and logging all sessions. The security policies of a configuration file may include different defined traffic properties and actions. For example, security policies of a department of a company in the configuration file may include logging actions for network traffic while security policies of another department of the company do not define logging action for network traffic. In another example, some security policies may include schedule properties for network traffic while others do not have schedule properties. Therefore, the types and form of security policies within a configuration file expressed in a first language may vary. When configuration converting module 121 converts the security policies in the first language into intermediate representations, the intermediate representations of the security policies may vary in formats. Because of the variations in formats of the intermediate representations, it may be difficult for optimizing module 124 to perform optimization on the intermediate representations and identify policy fragments in the intermediate representations. Therefore, pre-optimizing module 125 is used for pre-optimizing the security policies in the first language by unifying the formats of security policies in order that converting module 121 may convert security policies to the intermediate representations in a uniform manner.

Optimizing module 124 may increase the probability of finding policy fragments in the uniform intermediate representations. Pre-optimizing module 125 may unify the formats of security policies by incorporating omitted parts within the security policies without changing the definition of the security policies. For example, if a security policy lacks a schedule option, pre-optimizing module 125 may add "schedule always" which is the default option to the security policy in order that all security policies in the configuration file have schedule options. If a security policy lacks a logging option, pre-optimizing module 125 may add "logging none" to the security policy so that all security policies have logging options. After security policies are pre-optimized, the configuration file in the first language with unified security policies is converted by converting module 121 as described above with reference with FIGS. 1 and 2. Because the security policies in the first language are in a consistent formats, the intermediate representations of security policies converted by converting module 121 are also in a consistent and unified format. That is, the formats of the 5-tuple and other properties of the intermediate representations are unified. A user of the converter may also create a pre-optimization rule for a particular security policy. The pre-optimization rule may define what omitted parts may be incorporated into a security policy. Pre-optimization rules may be accumulated over time and a customized pre-optimization processing may be created for a particular enterprise network and policy fragments may be reduced when converting configuration files of the enterprise network from a first language to a second language.

Figure 4:
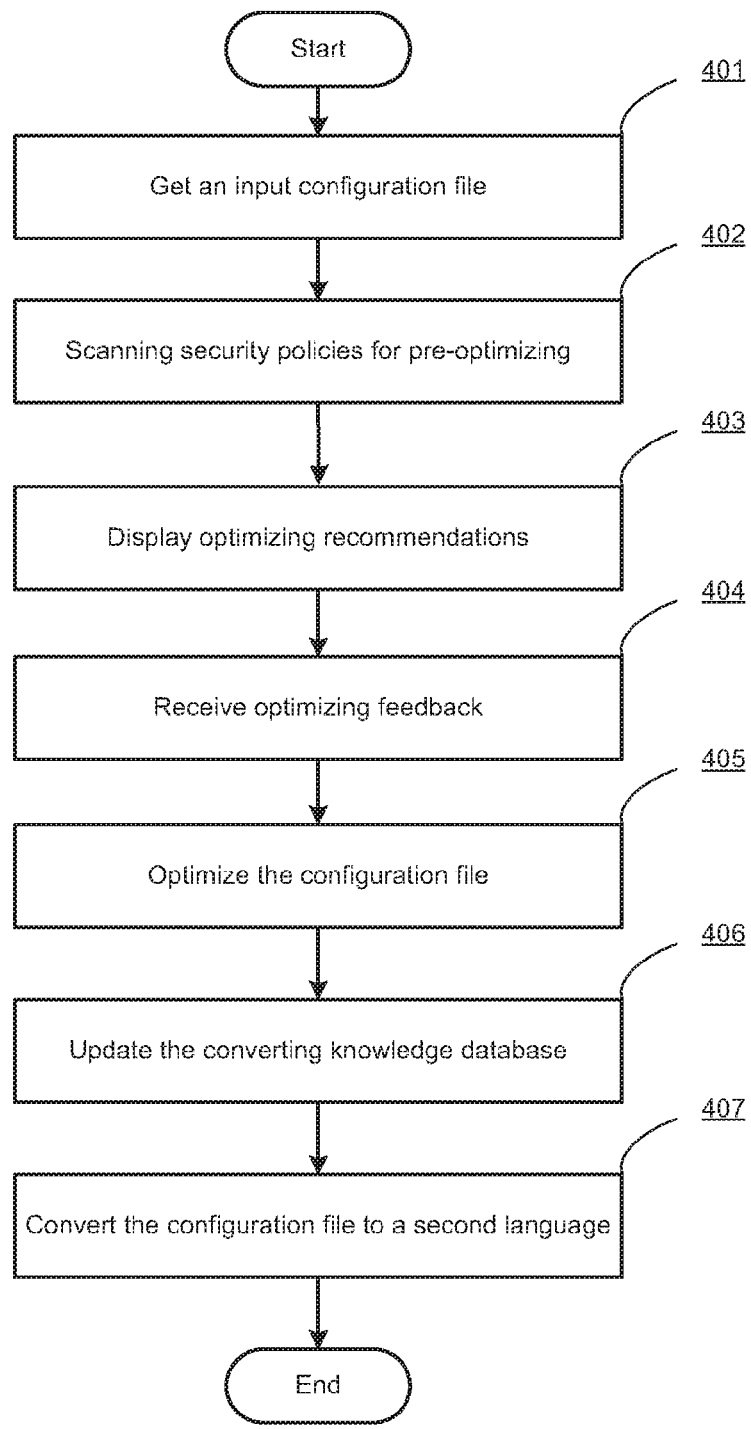
FIG. 4 is a flow diagram illustrating a method for converting a configuration file from one language to another with network security policy optimizing in accordance with another embodiment of the present invention.

FIG. 4 is a flow diagram illustrating a method for converting a configuration file from one language to another with network security policy optimizing in accordance with another embodiment of the present invention.

At block 401, a configuration converter receives a configuration file in a first language. The configuration file contains multiple security policies that control network traffic with defined properties. The security policies may be in different formats having different defined actions and network properties.

At block 402, the configuration converter may scan the security policies of the configuration file to find possible optimizations to the formats of the security policies in the first language. The optimization that is a pre-optimizing to the optimizing process of intermediate representations described in reference with FIGS. 1 and 2 may include unifying formats of the security policies by incorporating portions that are omitted when security policies are created. The incorporated portions of security policies may be default values that do not affect the definitions of the security policies but make the security policies uniform in format. For example, if no incoming interface for network traffic is defined in a security policy, an "incoming interface all" may be incorporated into the security policy so that all security policies of the configuration file may have an incoming interface option defined.

At block 403, the configuration converter may display recommendations for format optimization when non-uniform security policies are identified. For example, if a security policy is found in which a logging option is omitted, then the converter may suggest a "logging none" option may be incorporated within the security policy.

At block 404, the configuration converter receives feedback from the user. For example, the user may accept the recommendations provided by the converter or provide new optimizations to the security policies. For example, the user of the converter may select "logging all" instead of "logging none" when a security policy lacks a logging operation. The user of the converter may create specific rules for optimizing specific security policies. For example, the user may create a "logging all" rule for pre-optimizing security policies that are used for high level users while create a "logging none" rule for pre-optimizing security policies that are used for low level users.

At block 405, the security policy of the configuration file may be pre-optimized based on the selections or rules received from user. The security policies may be unified in form by incorporating omitted parts in order that all security policies in the configuration file may have the same formats.

At block 406, the converter may update a knowledge database for pre-optimization by storing the rules created by the user. The pre-optimization rules may be accumulated over time and a knowledge database for pre-optimization may be created for an enterprise network. Therefore, when a configuration file of the enterprise network is to be converted from a first language to a second language, the pre-optimization rules of the enterprise network may be applied to the same or similar policies. After the pre-optimization, the security policies of the configuration file may be unified in format and have the functions that are suitable for the enterprise network.

At block 407, the unified security policies may be converted to intermediate representations. The intermediate representations of the unified security policies may be optimized for policy fragments as described above with reference to FIG. 2. As the security policies are unified in format, the intermediate representations thereof are unified. Therefore, optimizing module may compare the intermediate representations of security policies and find out policy fragments more easily. The intermediate representations may then be translated into the second language as described with reference to FIGS. 1 and 2.

Figure 5:
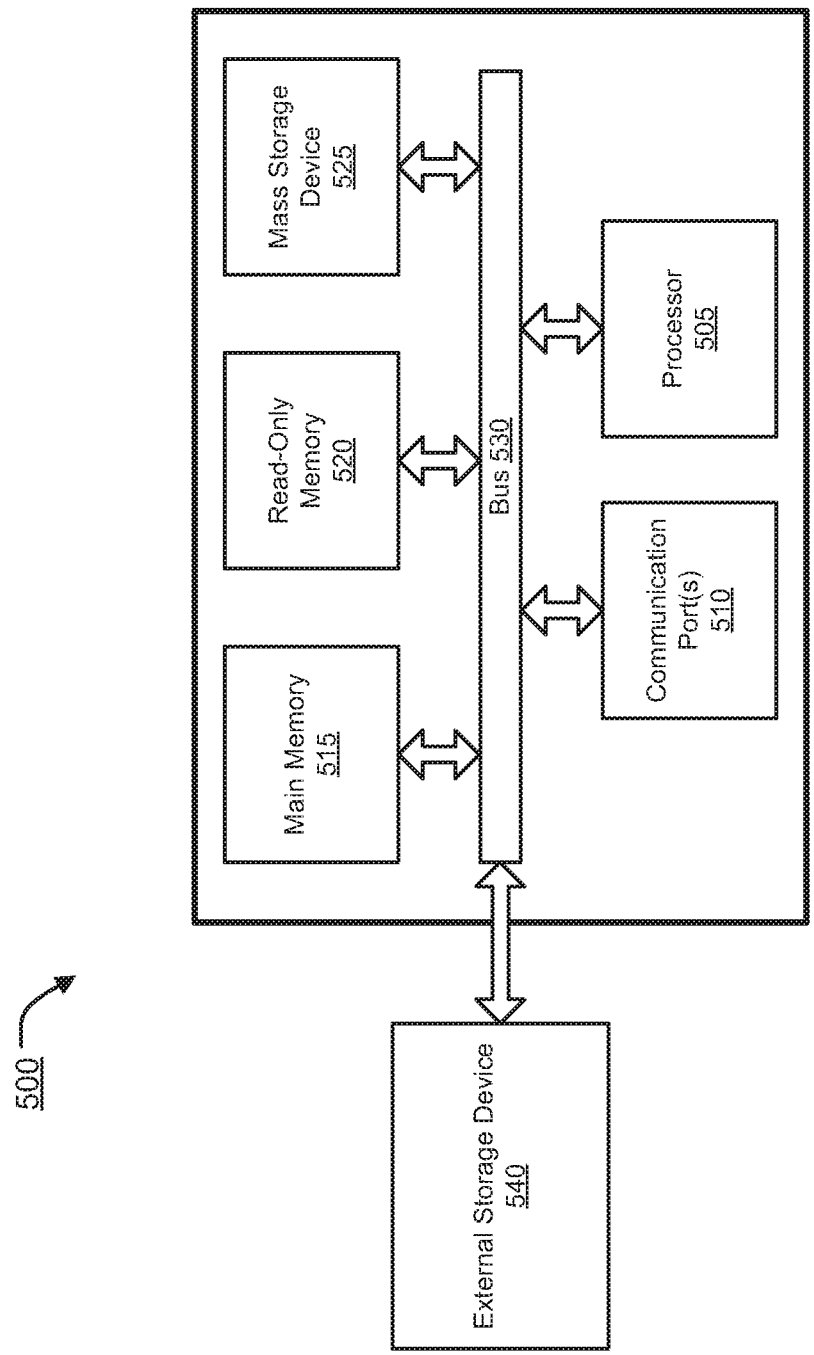
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network appliance, a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   parsing, by a network appliance configuration converter, network security policies of an input configuration file of a first network appliance to intermediate representations, wherein the network security policies of the input configuration file are expressed in a first language and the intermediate representations are general data structures for describing the network security policies wherein each of the intermediate representations comprises a syntax tree;
   optimizing, by the network appliance configuration converter, the network security policies contained in the intermediate representations by:
      performing an audit of security policies within the intermediate representation, wherein the audit includes one or more of:
      checking those of the security policies, if any, including an Internet Protocol (IP) address that is specified as ANY;
      checking those of the security policies, if any, including a port specified as ANY;
      checking those of the security policies, if any, having a range of IP addresses exceeding a pre-determined threshold;
      checking those of the security policies, if any, having a range of ports exceeding a pre-determined threshold;
      checking those of the security policies, if any, that allow access to one or more of a pre-determined set of ports of an internal network; and
      checking those of the security policies, if any, that allow access to one or more services of the internal network from an external network or a demilitarized zone (DMZ); and
   Denying access to a network if a potential leakage found in the security policies of the intermediate representations during the auditing step;
   converting, if the auditing step is successful, by the network appliance configuration converter, the intermediate representations to security policies of an output configuration file expressed in a second language.

2. The method of claim 1, wherein said optimizing, by the network appliance configuration converter, the network security policies contained in the intermediate representations further comprises:
   scanning, by the network appliance configuration converter, the intermediate representations for one or more policy fragments as indicated by:
   repeated security policies in which all parameters of the repeated security policies are the same;
   conflicting security policies in which only an action defined by the conflicting security is different;
   encompassing security policies in which an IP address or a port of a first security policy is encompassed by an IP address or a port of a second security policy while the first security policy and the second security policy specify a common action; or
   mergeable security policies in which only one of a source IP address, a source port, a destination IP address or a destination port specified by two different security policies are different while the two different security policies specify a common action.

3. The method of claim 2, further comprising, when a policy fragment is identified, keeping one security policy associated with the identified policy fragment and filtering out other security policies associated with the identified policy fragment.

4. The method of claim 2, further comprising:
   displaying, by the network appliance configuration converter, a list of security policies associated with the identified policy fragment;
   receiving, by the network appliance configuration converter, a selection from a user identifying a security policy from the list of security policies; and retaining, by the network appliance configuration converter, the selected security policy and filtering out other security policies associated with the identified policy fragment.

5. The method of claim 1, further comprising creating, by the network appliance configuration converter, a conversion rule for converting an original security policy of the first language to a security policy of the second language without generating a policy fragment.

6. The method of claim 5, further comprising storing, by the network appliance configuration converter, the conversion rule within a converting knowledge database for converting configuration files of a private network from the first language to the second language.

7. The method of claim 1, wherein the first language or the second language comprises a scripting language in which commands of the scripting language are capable of being executed by a network security appliance.

8. The method of claim 1, wherein the first language or the second language comprises a compiled language that is capable of being executed by a network security appliance after being compiled.

9. A computer system comprising:
non-transitory storage device having embodied therein instructions representing a network appliance configuration converter application; and
one or more processors coupled to the non-transitory storage device and operable to execute the network appliance configuration converter application to perform a method comprising:
parsing network security policies of an input configuration file of a first network appliance to intermediate representations, wherein the network security policies of the input configuration file are expressed in a first language and the intermediate representations are general data structures for describing the network security policies wherein each of the intermediate representations comprises a syntax tree;
optimizing the network security policies contained in the intermediate representations by:
performing an audit of security policies within the intermediate representation, wherein the audit includes one or more of:
checking those of the security policies, if any, including an Internet Protocol (IP) address that is specified as ANY;
checking those of the security policies, if any, including a port specified as ANY;
checking those of the security policies, if any, having a range of IP addresses exceeding a pre-determined threshold;
checking those of the security policies, if any, having a range of ports exceeding a pre-determined threshold;
checking those of the security policies, if any, that allow access to one or more of a pre-determined set of ports of an internal network; and
checking those of the security policies, if any, that allow access to one or more services of the internal network from an external network or a demilitarized zone (DMZ); and Denying access to a network if a potential leakage found in the security policies of the intermediate representations during the auditing step;
converting, if the auditing step is successful, the intermediate representations to security policies of an output configuration file expressed in a second language.

10. The computer system of claim 9, wherein said optimizing the network security policies contained in the intermediate representations further comprises:
scanning the intermediate representations for one or more policy fragments as indicated by:
repeated security policies in which all parameters of the repeated security policies are the same;
conflicting security policies in which only an action defined by the conflicting security is different;
encompassing security policies in which an IP address or a port of a first security policy is encompassed by an IP address or a port of a second security policy while the first security policy and the second security policy specify a common action; or
mergeable security policies in which only one of a source IP address, a source port, a destination IP address or a destination port specified by two different security policies are different while the two different security policies specify a common action.

11. The computer system of claim 10, wherein the method further comprises, when a policy fragment is identified, keeping one security policy associated with the identified policy fragment and filtering out other security policies associated with the identified policy fragment.

12. The computer system of claim 10, wherein the method further comprises:
displaying a list of security policies associated with the identified policy fragment;
receiving a selection from a user identifying a security policy from the list of security policies; and
retaining the selected security policy and filtering out other security policies associated with the identified policy fragment.

13. The computer system of claim 9, wherein the method further comprises creating a conversion rule for converting an original security policy of the first language to a security policy of the second language without generating a policy fragment.

14. The computer system of claim 13, wherein the method further comprises storing the conversion rule within a converting knowledge database for converting configuration files of a private network from the first language to the second language.

15. The computer system of claim 9, wherein the first language or the second language comprises a scripting language in which commands of the scripting language are capable of being executed by a network security appliance.

16. The computer system of claim 9, wherein the first language or the second language comprises a compiled language that is capable of being executed by a network security appliance after being compiled.

* * * * *